United States Patent [19]

O'Rourke

[11] Patent Number: 5,477,815
[45] Date of Patent: Dec. 26, 1995

[54] DOG CHEW TOY

[75] Inventor: Anthony O'Rourke, Malibu, Calif.

[73] Assignee: Booda Products, Inc., Gardena, Calif.

[21] Appl. No.: 69,702

[22] Filed: Jun. 1, 1993

Related U.S. Application Data

[63] Continuation-in-part of Ser. No. 932,770, Aug. 20, 1992, Pat. No. 5,215,038.

[51] Int. Cl.$^6$ .................................................. A01K 29/00
[52] U.S. Cl. .................................................. 119/710
[58] Field of Search .................................. 119/710, 707, 119/702; 57/160, 163, 144, 24, 7, 12; 273/58 A, 58 P, 58 K

[56] References Cited

U.S. PATENT DOCUMENTS

| | | |
|---|---|---|
| 412,963 | 10/1889 | Lowry . |
| 630,573 | 8/1899 | Smith . |
| 831,108 | 9/1906 | O'Rourke . |
| 1,175,303 | 3/1916 | Samuel . |
| 1,221,005 | 3/1917 | Schloss . |
| 1,412,446 | 4/1922 | Bentley . |
| 1,493,351 | 5/1924 | LeFort . |
| 1,987,632 | 6/1933 | Nutter et al. . |
| 2,110,979 | 3/1938 | Rider . |
| 2,382,704 | 8/1945 | Feron . |
| 2,974,559 | 7/1958 | Coggi . |
| 4,070,818 | 1/1978 | Hamel ........................................ 57/12 |
| 4,100,727 | 7/1978 | Hamel ........................................ 57/12 |
| 4,541,231 | 9/1985 | Graham et al. ............................ 57/12 |
| 4,662,164 | 5/1987 | Morrison .................................... 57/12 |
| 4,922,701 | 5/1990 | Sawhney et al. .......................... 57/12 |
| 4,924,811 | 5/1990 | Axelrod . |
| 5,033,410 | 7/1991 | Sigurdsson ............................. 119/710 |
| 5,092,272 | 3/1992 | O'Rourke . |
| 5,215,038 | 6/1992 | O'Rourke . |

Primary Examiner—Gene Mancene
Assistant Examiner—Thomas Price
Attorney, Agent, or Firm—Lyon & Lyon

[57] ABSTRACT

A chew toy for dogs formed of a length of composite rope having an inner core defined by one or more strands of twisted threads of natural plant or synthetic fibers such as sisal or nylon, and a soft outer shell defined by a plurality of strands of soft pliable cotton threads which are twisted about the inner core. The inner core is less water absorbent that the outer shell to promote drying of toy when wetted with the dog's saliva to inhibit bacteria growth in the toy. In the preferred configuration of the chew toy, the core fibers are frangible and a pair of knots are formed in the composite rope proximate the extended ends thereof to prevent the rope from unraveling and securing the core within the cotton shell. The resultant outer cotton shell provides a cleaning of the dog's teeth and a gentle massaging of its gums when chewed, while the frangible core in addition inhibiting bacteria growth provides the toy with a crunchy sound and texture and promotes a collapsing of the shell about the core to enhance the ability of the dog to pass the toy if ingested after chewing.

4 Claims, 1 Drawing Sheet

DOG CHEW TOY

This is a continuation-in-part of applicant's application Ser. No. 07/932,770, filed Aug. 20, 1992, and entitled Dog Chew Toy, now U.S. Pat. No. 5,215,038.

BACKGROUND OF THE INVENTION

The present invention relates to a novel chew toy for dogs. Dog chew toys are well-known and embody numerous different configurations and materials. One of the more popular of such toys was previously developed by applicant and comprises a short length of cotton rope having large knots near the ends thereof so as to resemble a classic dog bone configuration. The soft cotton rope provides a brushing effect and flossing of the dog's teeth and a gently massaging of its gums when chewed and thus provides therapeutic benefits as well as playful enjoyment for the dog. While this and other configurations of cotton chew toys have enjoyed widespread success, the soft cotton material which provides the therapeutic benefits of such toys also has some disadvantages. When the cotton becomes wet with saliva, it tends to dry relatively slowly which can lead to bacteria growth on the toy. Dogs also seem to be attracted to chew toys that are crunchy in texture and sound when chewed. Cotton is very soft and pliable and gives off no sound when chewed. Cotton also is relatively odorless and thus does not take advantage of the fact that many dogs are attractive by different smells. In the event that a dog should swallow a cotton chew toy, the cotton has a tendency to swell which could prevent the chew toy from passing through the dog's system and cause blockage. Thus, while cotton has definite therapeutic benefits when utilized as a dog chew toy, it also has some inherent disadvantages. It would be desirable to provide a dog chew toy which retained the therapeutic benefits derived from the use from cotton but did not possess its disadvantages. The chew toy of the present invention achieves these objectives.

SUMMARY OF THE INVENTION

Briefly, the present invention is directed to a dog chew toy comprised of a soft pliable outer shell and a relatively non-absorbent inner core. The outer shell is formed of a plurality of threads of cotton fibers or a blend of cotton and synthetic fibers which are twisted about a core preferably formed of natural agave fibers such as sisal so as to form a length of composite rope. The composite rope is then formed into the desired chew toy configuration. In the preferred configuration of the toy, the length of rope is cut relatively short and knots are formed therein proximate the ends thereof to prevent the rope from unraveling, retain the sisal core within the cotton shell and provide the resultant toy with a configuration resembling a classic chew bone.

As the composite toy is chewed by a dog, the soft cotton outer portion of the toy provides a cleaning and flossing of the dog's teeth and a soft massaging of its gums while crispy sisal core provides the toy with a crunching sound and texture. The use sisal fibers in the core also provides the toy with a smell which is highly attractive to dogs. In addition to sisal and other natural fibers, the core could also be formed of synthetic fibers such as nylon orlon. Sisal and other core materials can also be impregnated with a flavoring which is attractive to dogs. The core is less absorbent than the cotton shell and provides ventilation through the toy when wetted with the dog's saliva to promote drying of the cotton, inhibiting bacterial growth in the toy. When the toy is chewed over a period of time, the core will slowly fracture and break into smaller pieces retained within the outer cotton shell. In the event the chewed toy were to be swallowed by a dog, the fractured core will render the toy more pliable tending to collapse the end knots. As fractured sisal begins to degrade within the dog's stomach, the cotton shell will further collapse, thereby enhancing the ability of the dog to pass the toy before any blockage could present a health hazard to the dog.

It is the principal object of the present invention to provide an improved therapeutic chew toy for dogs.

It is another object of the present invention to provide a chew toy for dogs which has a crunchy texture and sound when chewed while providing a cleaning and flossing of the dog's teeth and a gentle massaging of its gums.

It is a further object of the present invention to provide a cotton chew toy for dogs which dries relatively quickly when wetted with saliva to inhibit bacterial growth thereon.

It is yet another object of the present invention to provide a cotton chew toy for dogs having an odor which is attractive to dogs.

It is still a further object of the present invention to provide a cotton chew toy for dogs having a partially degradable core to facilitate the passage of the toy through the dog in the event the toy is swallowed by the dog.

These and other objects and advantages of the present invention will become readily apparent from the following detailed description taken in conjunction with the accompanying drawings.

DESCRIPTION OF THE PREFERRED EMBODIMENT IN THE DRAWING

Referring now in detail to the drawings, the chew toy 10 of the present invention comprises an outer shell 12 formed of a plurality of threads of a soft pliable material, such as cotton, which are twisted about a relatively non-absorbent fracturable fiber core 14 so as to form a length of composite rope 15. Rope 15 is then formed into the desired toy configuration such as the bone-like configuration illustrated in FIG. 1.

Figure 1:
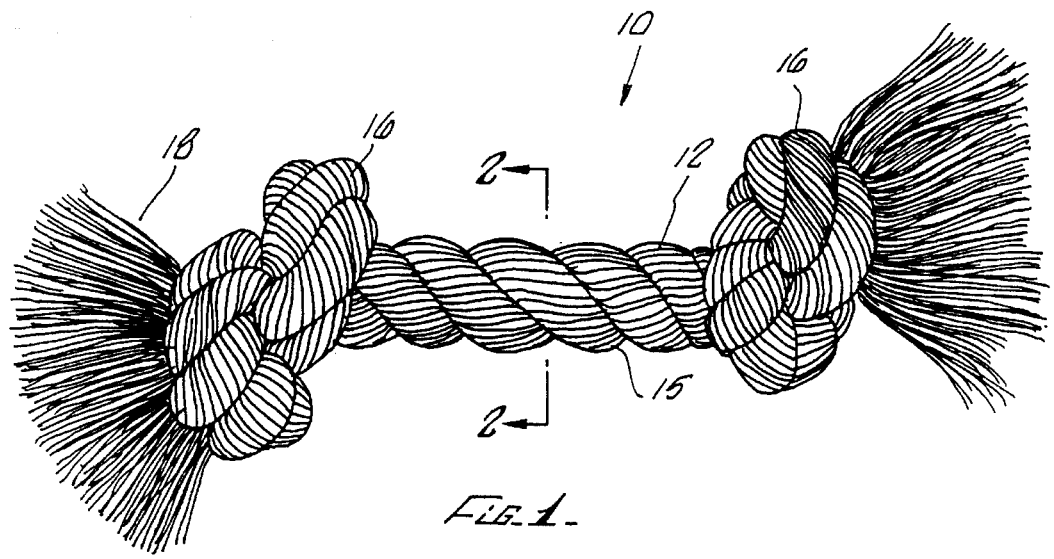
FIG. 1 is a perspective view of the dog chew toy of the present invention.
Figure 2:
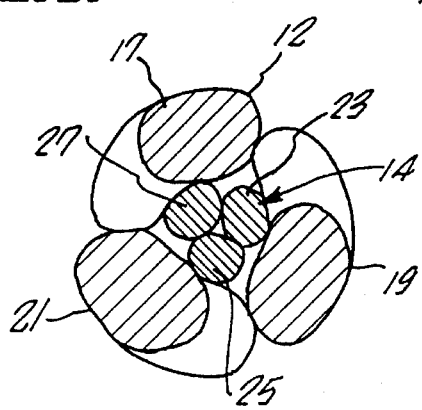
FIG. 2 is an enlarged sectional view taken along the line 2—2 of FIG. 1.

In the first embodiment of the invention illustrated in FIGS. 1 and 2, the outer shell 12 of toy 10 is defined by three strands or skeins 17, 19 and 21 of twisted cotton threads which are twisted together about the inner core 14 in a conventional rope forming pattern to define the composite rope 15. The core 14 of toy 10 is preferably formed of three woven strands 23, 25 and 27 of twisted natural or synthetic fibers with sisal fibers being preferred. The strands 23, 25 and 27 are preferably twisted into a rope configuration to provide the core 14 with more structural integrity and thereby increase the tendency of the core to fracture when chewed. If desired, however, a single strand of twisted fibers could be employed in the formation of core 14 or two or more strands could be employed in a parallel or twisted disposition. In the preferred chew toy configuration shown in FIG. 1, the formed length of composite rope 15 comprised of the outer cotton shell 12 and inner sisal core 14 is cut relatively short and has knots 16 formed proximate its extended ends to prevent the rope from unraveling, secure the core within the outer rope shell and provide the toy with the desired configuration resembling a classic dog bone.

It is to be understood that other toy configurations of dog chew toys or tug and chew toys could also be formed with the composite rope 15 and provide the above-described therapeutic benefits of the chew toy 10. Examples of such other toy configurations could include but are not limited to elongated knotted rope toys such as those disclosed in U.S. Design Pat. Nos. 330,100 and 329,310; closed loop toys such as those disclosed in U.S. Design Pat. Nos. 330,614 and 328,805; and rope chew toys which do not include end knots such as that disclosed in U.S. Design Pat. No. 327,962.

Regardless of the particular design configuration formed with the composite rope 15, the use of cotton threads to form the outer shell 12 of the toy 10 provides the toy with a soft outer layer of material which, when chewed, will provide a cleaning and flossing of the dog's teeth and a gently massaging of its gums. The fracturable crunchy core encased within the soft cotton shell cooperates with the shell to provide the desired chew toy characteristics recited in the Summary of the Invention above. While cotton is the preferred material for forming the threads of the outer shell 12 of the toy 10, other soft materials such as blends of cotton and synthetic fibers such as polyester could be employed. If blended threads are utilized in forming shell 12, the threads should be comprised of a sufficiently high percentage of cotton to maintain the desired softness in the outer shell 12. Preferably, such threads should comprise at least ninety percent cotton and more preferably over 95 percent.

While natural sisal fibers have been found to provide a highly suitable material for the core 14, it should be noted that other species of natural agave plant fibers having the above recited desired characteristics of the core 14, such as henequen, could also be used. Other plant fibers such as hemp, jute and manila may also prove suitable for use in forming core 14. Sisal fibers are presently preferred for their crunchy texture, frangibility and strength. Sisal not only provides the core its desired texture and gives off a crunchy sound when the fibers are fractured by the dog's teeth, but also breaks down relatively slowly when chewed to give the toy a longer useful life. While the strength of sisal may prolong the fracturing of the core and thus might retard the ability of the knotted chew toy 10 to pass through a dog if ingested, such an event is believed to be extremely unlikely until the toy has been chewed thoroughly and the integrity of the end knots 16 greatly diminished upon the fracturing of the sisal within the knots. In addition, sisal fibers are at least partially digestible in a dog's stomach which contributes to the breakdown of the toy if ingested, and enhances the ability of the dog to pass an ingested toy.

While natural fibers and particularly natural agave fibers such as sisal are the preferred material for forming the core 14 of toy 10, synthetic fibers, such as nylon or orlon, could be formed into a synthetic yarn and used in lieu of natural fibers in the formation of core 14. Such fibers preferably would be formed so as to be sufficiently frangible so as to fracture upon being chewed by a dog. While being less crispy than sisal, such a synthetic core would still provide the toy with an attractive crunchy-like sound when chewed. The core could also be constructed from other synthetic materials such as polyester. While a core constructed of polyester threads may not possess the frangible characteristics of the materials discussed above and not provide the toy with an attracting sound when chewed, a polyester core would still be less absorbent than cotton and thus promote drying to inhibit bacteria growth. Polyester also would not swell when wetted. Accordingly, while polyester is less suited for use as a core material than natural plant fibers and other synthetics such as nylon and orlon, a polyester core would still provide the chew toy with advantages over the popular all-cotton rope chew toys.

If desired, one or more thin strips 40 of plastic material such as cellophane could be disposed within or adjacent the strands of the synthetic or natural core to further enhance the crunching sound of the toy with a crackling noise to increase the attraction of the toy to dogs. Preferably a plurality of such strips would be employed. Strips 40 would be particularly useful with a core formed of polyester or other synthetic material which, unlike the preferred natural and synthetic core materials, would not provide the toy with a crunching sound when chewed.

To form the chew toy 10 of the present invention, the three cotton strands or steins 17, 19 and 21 are first formed by twisting together the cotton or blended cotton threads as in the first step of a conventional rope forming process. The formed strands 17, 19 and 21 are then twisted together about a length of rope formed of sisal or other suitable natural or synthetic fibers in the same pattern one would use to form a conventional three-ystrand rope. The resultant composite rope 15 is then cut to a desired length and formed into the desired toy configuration. In the configuration of toy 10 shown in the drawings, after the rope is cut to the desired length, the end knots 16 are formed and pulled tight and the desired amount of excess cotton and core material is cut off to provide the resultant chew toy with its desired appearance. If desired, all or a portion of the threads comprising shell 12 could be colored with one or more non-toxic dyes prior to forming the strands to provide a colored or multi-colored appearance for the chew toy 10 or to provide an identification of a particular flavoring which has been imparted to the toy. Such color coding could also be achieved by the use of differently colored synthetic threads in the formation of core 14 where the ends of the core would be visible as in the preferred toy configuration illustration FIG. 1.

Figure 3:
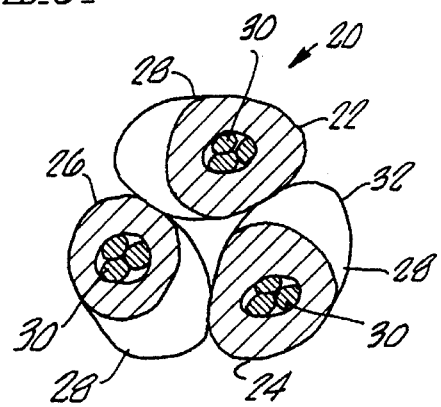
FIG. 3 is an enlarged sectional view of an alternate embodiment of the invention.
Figure 4:
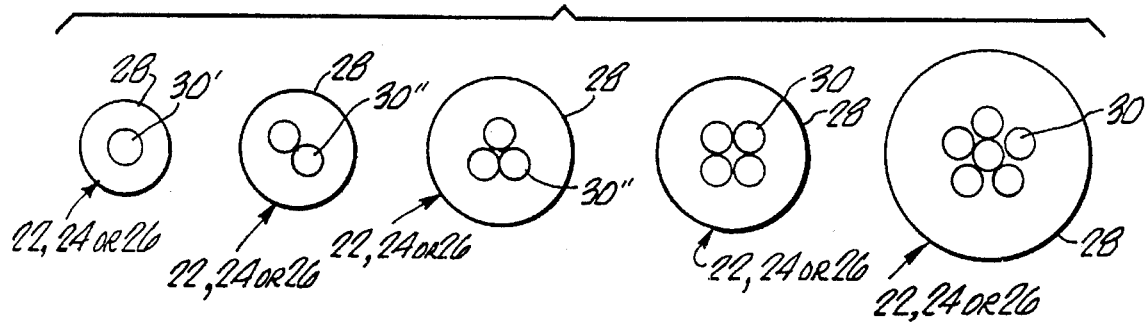
FIG. 4 is a schematic representation of cross-sections of differently sized composite strands employed in the alternate embodiment of the invention illustrated in FIG. 3.

An alternate and preferred embodiment of the invention is illustrated in FIGS. 3 and 4. This embodiment differs from the prior embodiment in that in lieu of a single core 14 of natural or synthetic fibers being centrally disposed within the outer cotton rope shell 12, separate cores are provided in each of the three twisted strands or skeins which comprises the chew toy. As seen in FIG. 3, the chew toy 20 of this alternate embodiment is comprised of three twisted composite strands or skeins 22, 24 and 26 with each strand being formed so as to comprise an outer soft pliable shell 28 and an inner core 30. Each of the shells 28 is preferably comprised of a plurality of cotton or blended cotton threads which are twisted about a core 30. As with core 14 of the prior embodiment each of the cores 30 is formed of natural plant fibers such as sisal or of synthetic fibers such as nylon, orlon or polyester. The pattern and process for twisting the soft pliable outer threads about the core 30 to form shell 28 are the same as are commonly used in the formation of a conventional strand or skein of threads, the only difference being that in forming strands 22, 24 and 26, the cotton or other soft pliable threads are twisted about an inner core 30 as opposed to being twisted only about each other.

The individual cores 30 in strands 22, 24 and 26 of toy 20 can be formed by a length of natural or synthetic rope as in core 14 of the prior embodiment or, as shown in FIGS. 3 and 4, by one or more parallel or twisted strands 34 of twisted threads formed of natural or synthetic fibers. The three composite strands 22, 24 and 26, each with its own outer cotton shell 28 and inner core 30, are then twisted together in the conventional rope forming pattern to form a length of composite rope 32 of the two materials. As with the prior embodiment of the invention, the formed length of composite rope 32 is then cut to a desired length and formed into the desired toy configuration. In the preferred toy configuration, end knots would be formed therein as in the prior embodiment to provide toy 20 with the same appearances as toy 10 as seen in FIG. 1 while preventing the ends of the toy from unraveling. This embodiment of the invention has the advantage over the prior embodiment of more effectively dispersing the core fibers throughout the formed toy 20 to facilitate access of the core to the teeth while making it more difficult for the dog to separate the cotton shell from the core and thereby prolonging the useful therapeutic life of the toy.

In forming this alternate embodiment of the invention, it may be preferable in certain instances to use a single strand comprised of three skeins of twisted core threads to form core 30 as seen in FIG. 3 or a plurality of such strands disposed in parallel disposition as shown in FIG. 4, or in a twisted disposition, as opposed to using lengths of rope to form the individual cores 30. The preferred configuration of both toy 10 of the prior embodiment and toy 20 of this alternate embodiment is that shown in FIG. 1. As seen therein, loose tassels 18 are defined by the frayed ends of the chew toy adjacent end knots. Forming relatively small strands of sisal threads into a rope configuration imparts additional twisting to the threads which, due to the nature of the sisal, will form kinks therein which will not fall out as is the case with the twisted cotton threads. Accordingly, to provide the twisted ends of the sisal threads in such tassels with the same appearances as the frayed ends of the cotton thread, it is necessary to comb out the ends of the sisal threads within the tassels after formation of the toy to remove the kinks therein. This additional manufacturing step can be eliminated by not forming the individual sisal cores 30 of the three strands 22, 24 and 26 into a rope configuration but instead utilizing either a single sisal strand or a plurality of sisal strands disposed in parallel as seen in FIG. 4 to form each of the cores 30 of the composite strand.

In configurations of dog chew toys utilizing this alternate embodiment of the present invention which, unlike that illustrated in FIG. 1, do not employ decorative loose tassels, the need for combing out the kinked ends of sisal cores is obviated. In such cases, it would be preferable to utilize a single length of appropriately sized sisal rope to form each of the cores 30 of the composite strands as opposed to one or more parallel strands of sisal threads due to the increased structural integrity of the rope configuration.

By increasing the structural integrity of the individual natural or synthetic cores, a dog's teeth will more readily fracture the core threads when chewing on the toy and be less likely to pass between the threads, thereby increasing the crunchiness of the toy. For this reason, it is preferable that a length of sisal or other fibrous rope be used in the first embodiment of the invention in which a core 14 of natural or synthetic fibers is centrally disposed within the composite rope 15. In the multiple core configuration of toy 20, however, the twisting of the individual cores 30 with the composite strands 22, 24 and 26 to form the composite rope 32 will provide additional sufficient structural integrity to the cores 30 to give the toy the desired crunchy sound and texture when chewed. The crunchiness of this alternate embodiment could, if desired, be increased by using a twisted rope configuration for each core 30 in lieu of one or more sisal strands, albeit in some cases at the additional expense of the combing step when required for aesthetic purposes. If a crackling sound is also desired to increase the attractiveness of the toy 20 to dogs, as for example when a synthetic fibers are used to form the cores which are less crispy than natural plant fibers such as sisal, a plurality of thin strips of a plastic material, such as strip 40 discussed above, could be disposed within one or more of the composite strands 22, 24 and 26 adjacent the core 30 therein.

Because the alternate embodiment of the invention employs three separate cores 30 as opposed to the single central core 14 of the prior embodiment, the individual cores 30 must be of a smaller diameter than the single core 14 to provide a length of composite rope 32 of the same diameter as a length of composite rope 15. FIG. 4 illustrates different numbers and configurations of sisal strands comprising a core 30 which might be employed in differently sized composite strands 22, 24 and 26 to form the composite rope 32 in varying diameters. The single strand core 30' is utilized in the small diameter strands 22, 24 and 26 for forming the smaller diameter rope. As the desired diameter of the composite rope 32 increases, the number of the twisted strands in each core 30 is preferably increased as illustrated in FIG. 4. For example, using strands of threads of about 5/32 inch in diameter, a single strand core 30' could be employed in each of strands 22, 24 and 26 to form a length of composite rope 32 having a diameter of about 3/4 inch. A double strand core 30" could be employed in forming a length of such rope having a diameter of about one inch. A three strand core 30''' could be used in forming rope of a diameter of about 1 1/8 inch. Four strands could be used in rope of about 1 3/8 inches in diameter and, for extremely large diameter rope on the order of 2 inches in diameter, six of the 5/32 inch diameter sisal strands could be used. As seen in FIG. 4, the thickness of the outer cotton shells 28 of strands 22, 24 and 26 is also increased in the larger diameter strands. By so varying the diameter of the composite rope, differently sized chew toys 20 can be formed for differently size dogs. Increasing the number of strands in the cores of the larger diameter composite rope 32, as opposed to using single strands of increasing diameters, eliminates the need to maintain sisal strands of varying diameters to form differently sized chew toys 20.

In addition to the above-recited advantages of the fibrous core of the present invention, the core can also be used to impart an attractive scent and/or flavoring to both embodiments of the chew toy of the present invention. By spraying a sisal with a flavored liquid smoke prior to forming the cotton shell 12 or shells 28 about the sisal, the sisal fibers will absorb a sufficient amount of the flavoring in the liquid smoke to impart the flavoring to the toy. An example of an attractive scent and taste (collectively referred to as flavoring) is beef extract. Other flavorings could also be used. Flavoring of the sisal core can also be accomplished by cooking a meat such as pork, beef or chicken over a hickory flavored fire and directing the smoke rising therefrom through the sisal. Either the spraying of liquid smoke or the use of airborne smoke could be carried out while the skeins of sisal or sisal rope are still in coils. When the flavor impregnated sisal skeins or rope are then drawn from the coils and formed into the core or cores of the chew toys 10 or 20 as described above, the absorbent flavoring will be retained within the toy, making the toy even more attractive to dogs. Flavoring the chew toy by means of liquid or airborne smoke could also be employed when utilizing the alternative core materials discussed above. While such fibers are not so absorbent as cotton and thus promote drying of the toy, they are sufficiently absorbent to retain the flavoring of the smoke therein. In addition to the use of smoke and liquid smoke, the strands comprising the core of the toy could be immersed in or otherwise subjected to an aqueous solution containing the desired flavoring. Upon drying, the threads would retain the flavoring whereupon the outer shell would be formed about the core or cores as above described.

Various other changes and modifications may be made in carrying out the present invention without departing from the spirit and scope thereof. Insofar as these changes and modifications are within the purview of the appended claims, they are to be considered as part of the present invention.

I claim:

1. A method of forming a chew toy for dogs comprising the steps impregnating a plurality of natural plant fibers with a flavoring; twisting a plurality of threads comprising cotton fibers about said plurality of natural plant fibers so as to define a plurality of composite strands of material having inner flavored plant fiber cores and outer cotton shells, twisting said composite strands together so as to define a length of composite rope; and forming said rope into a desired chew toy configuration.

2. The method of claim 1 wherein said rope forming step comprises cutting said length of composite rope to a desired length and forming knots in said length proximate the ends thereof.

3. The method of claim 1 wherein said impregnating step comprises spraying said natural plant fibers with a flavored liquid smoke whereupon the flavoring in said smoke is absorbed and retained by said natural plant fibers.

4. The method of claim 1 wherein said impregnating step comprises subjecting said natural plant fibers to airborne flavored smoke whereupon the flavoring in said smoke is absorbed and retained by said natural plant fibers.

* * * * *